Figure 1:
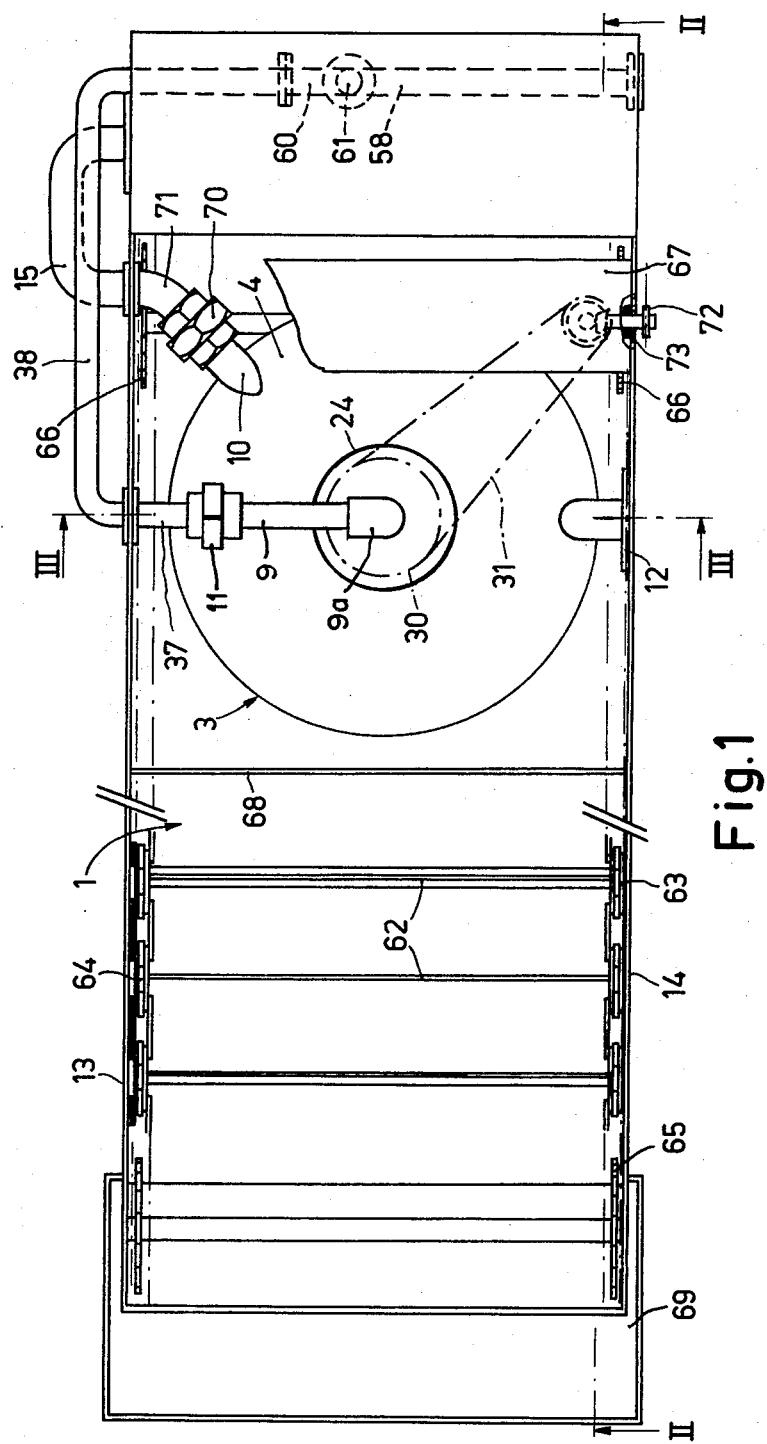

United States Patent

Freeland, deceased

[15] 3,674,151

[45] July 4, 1972

[54] BACKFLUSHING FILTER

[72] Inventor: William Freeland, deceased, late of Hinchley Wood, Surrey, England by Iris Mary Freeland, executrix

[73] Assignee: U.S. Philips Corporation

[22] Filed: July 2, 1969

[21] Appl. No.: 840,600

[30] Foreign Application Priority Data

July 2, 1968     Great Britain .................... 31,560/68

[52] U.S. Cl. ............................. 210/298, 210/320, 210/411, 210/526
[51] Int. Cl. ...................................................... B01d 29/38
[58] Field of Search .......... 210/333, 340, 441, 345, 411–415, 210/298, 526, 320

[56] References Cited

UNITED STATES PATENTS

| | | | |
|---|---|---|---|
| 3,169,109 | 2/1965 | Hirs | 210/333 X |
| 3,228,528 | 1/1966 | Mummeat et al. | 210/333 |
| 3,378,143 | 4/1968 | Tipping | 210/411 |

*Primary Examiner*—John Adee
*Attorney*—Frank R. Trifari

[57] ABSTRACT

An apparatus for filtering contaminants from liquid and for cleaning the filter, the apparatus including a filtering screen through which the liquid is drawn in a first direction, and a backflushing nozzle that is moved to various positions adjacent the screen, with clean liquid directed from the nozzle in an opposite direction through the screen to flush off contaminants, and a shroud to aid in removal of contaminants.

13 Claims, 5 Drawing Figures

INVENTOR.
WILLIAM FREELAND

INVENTOR.
WILLIAM FREELAND

BACKFLUSHING FILTER

This invention relates to a liquid-filtering apparatus which is equipped for backflushing. Backflushing is an operation in which contaminant which is separated from the liquid being filtered and which builds up on the filtering element of the apparatus is flushed off this element by passing clean liquid back through the filtering element in the opposite direction to that in which liquid flows through the element in the filtering process. Backflushing prevents the filtering element becoming clogged with contaminant.

According to the invention there is provided a liquid-filtering apparatus comprising a container for receiving contaminated liquid to be filtered, a suction chamber having a liquid-pervious wall which forms a filtering element and through which the suction chamber communicates with the interior of the container, means for creating suction in the suction chamber so as to draw liquid from the container into the suction chamber through the filtering element, a backflushing nozzle located in the suction chamber and movable over the filtering element in contact therewith, means for delivering clean liquid under pressure to the backflushing nozzle to be discharged therefrom through the filtering element for the purpose of flushing off the element contaminant separated from the contaminated liquid and adhering to the filtering element, and means for removing from the container the contaminant which is flushed off the filtering element.

In a preferred embodiment of the invention the filtering element comprises a circular filter screen and the backflushing nozzle extends radially of this screen and is rotatable about the central axis thereof.

In the preferred embodiment the suction chamber is formed by a dome which is supported in the container with its mouth directed downwards, and the filter screen is fixed across the mouth of the dome.

Figure 2:
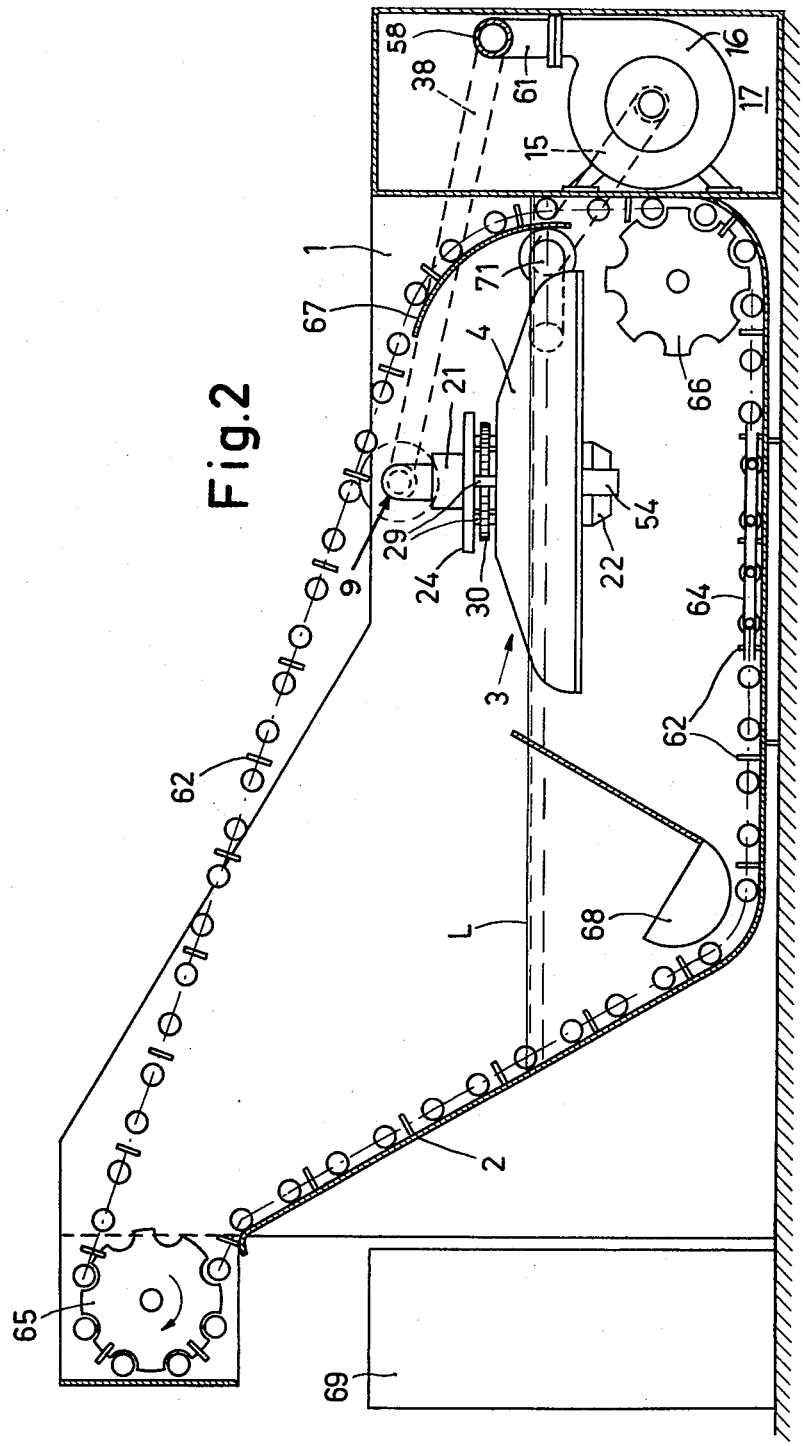
Figure 3:
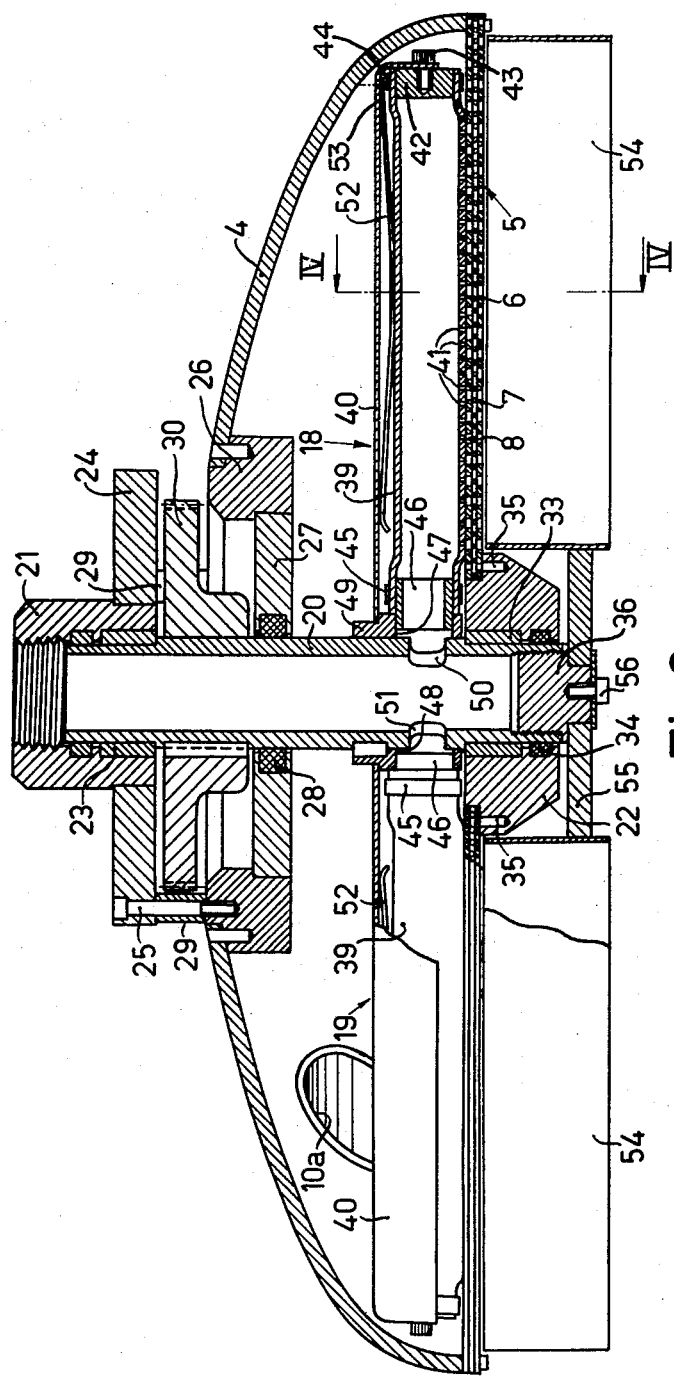
Figure 4:
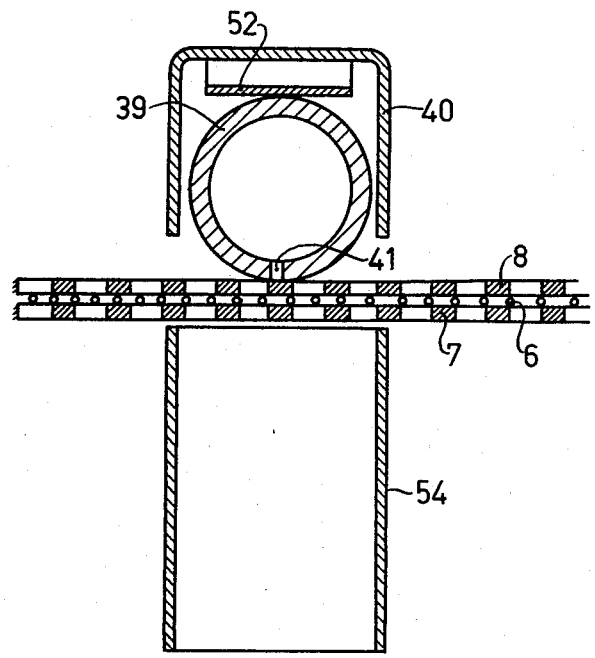
Figure 5:
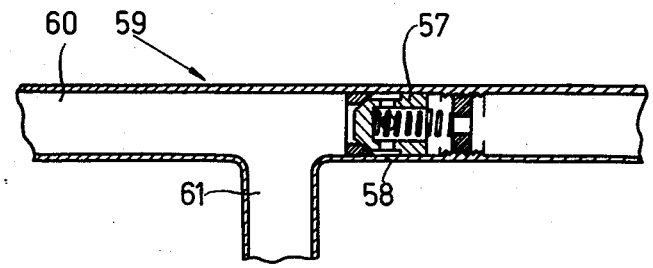

In order that the invention may readily be carried into effect, an embodiment thereof will now be described with reference to the accompanying drawings, in which:

FIG. 1 is a plan view of an apparatus constructed in accordance with the invention, FIG. 2 is a sectional side elevation of this apparatus taken on the line II—II of FIG. 1, FIG. 3 is a sectional view of the suction chamber of the apparatus taken on the line III—III of FIG. 1 and drawn to an enlarged scale, FIG. 4 is a section taken on the line IV—IV of FIG. 3, and FIG. 5 is a diagrammatic sectional view of a detail of the apparatus.

The apparatus shown in the drawings comprises an open-topped tank 1 (FIGS. 1 and 2) into which is fed the liquid to be filtered, which may be machine-tool coolant, for example. One end wall of the tank is inclined to form a ramp 2. Located inside the tank is a suction chamber 3 which is formed by a dome 4 across the mouth of which is fixed by screws 5a a circular filter screen 5 (FIG. 3). The screen 5, which forms a liquid-pervious wall of the suction chamber, is composed of a sheet 6 of nylon or wire mesh sandwiched between two perforated metal plates 7 and 8. The dome 4 is suspended from a pipe 9 which extends horizontally across the interior of the tank 1. The dome is connected at its center to the pipe 9 by a junction 9a. At one end the pipe 9 is coupled by a spigot coupling 11 of known construction to a short pipe 37 which is fixed to a side wall 13 of the tank 1. The pipe 37 communicates through a hole in the side wall 13 with a pipe 38 which is connected to the outlet of a centrifugal pump 16 (FIG. 2) housed in a compartment 17 at the end of the tank 1 opposite to the ramp 2. At its other end the pipe 9 is blanked off and supported in a hole in a plate 12 which is fixed to a side wall 14 of the tank 1. The pipe is rotatable in the plate 12 for a purpose to be described later herein.

Fixed to the outer side of the dome so as to project radially therefrom is a short pipe 10 which communicates with the interior of the dome through an aperture 10a (FIG. 3) in the wall of the dome. The pipe 10 is coupled by a cone-seat coupling 70 of known construction to another short pipe 71 which communicates through a hole in the side wall 13 of the tank 1 with a pipe 15 which leads to the inlet of the pump 16.

When the apparatus is in operation, the contaminated liquid to be filtered is fed continuously into the tank 1. Suction created in the suction chamber 3 by the pump 16 draws liquid from the tank 1 into the suction chamber through the filter screen 5 so that contaminant is separated from the liquid by the screen. The filtered liquid is delivered by the pump to a storage tank or to the point of use, as may be desired.

Contaminant which builds up on the lower side of the filter screen 5 as filtering progresses is flushed off the screen by a continuously operating mechanism which includes two rotary backflushing nozzles 18 and 19 (FIG. 3). The nozzles are of elongate form and extend radially from a vertical hollow shaft 20 which is rotatably supported at the center of the suction chamber 3 in upper and lower bearings 21 and 22. The upper bearing 21 incorporates a bearing bushing 23 and has a flange 24 which is secured by screws 25 to a ring member 26 fixed in the top of the dome 4. Fixed in the ring member 26 is a circular plate 27 having a central aperture through which the shaft 20 passes. A gland 28 provides a seal between the shaft 20 and the plate 27. The flange 24 of the bearing 21 is spaced from the ring member 26 by sleeves 29 on the screws 25 to accommodate a chain sprocket 30 which is keyed to the shaft 20 and around which passes a driving chain 31 (indicated by a dot-dash line in FIG. 1). The chain transmits drive to the shaft 20 from an electric motor 32 mounted in the compartment 17. The drive is transmitted from the motor to the chain by a transmission mechanism 72 which enters the tank 1 through a bearing 73 in the side wall 14 of the tank, which bearing is sealed so that liquid cannot leak from the tank via the bearing. (The chain 31, motor 32 and transmission mechanism 72 are omitted from FIG. 2 in the interests of clarity.) When the apparatus is in operation the shaft 20 is continuously rotated by the chain 31.

The lower bearing 22 supporting the shaft 20 incorporates a bearing bushing 33 and a sealing gland 34 and is located in a central aperture in the filter screen 5. The bearing 22 is secured to the screen 5 by screws 35. At its lower end the shaft 20 is closed by a screw-threaded plug 36. To the upper end of the shaft is connected the vertical limb of the junction 9a in the pipe 9 (FIG. 1).

The nozzles 18 and 19 are fixed to the shaft 20 diametrically opposite one another and each of them comprises a flexible tube 39 (FIG. 3) which is supported at its ends in a beam 40 of inverted channel section and which is formed with a row of orifices 41 in its lower side. The tube 39 may be made of rubber, for example. At its outer end the tube is supported by a cylindrical plug 42 which closes the outer end of the tube and which is secured by a screw 43 to the outer end of the beam 40. The tube is secured to the plug 42 by a metal band 44. A similar band 45 secures the inner end of the tube on a hollow spigot 46 which is welded in one of two diametrically opposed apertures 47 and 48 in a sleeve 49 which is keyed to the shaft 20 for rotation therewith and to which the inner ends of the beams 40 are fixed. The apertures 47 and 48 are aligned with two diametrically opposed apertures 50 and 51 in the wall of the shaft 20. A leaf spring 52 is provided in each of the beams 40 to press the respective tube 39 into contact with the upper surface of the filter screen 5. The spring is secured at one end to the web of the beam by a rivet or like fastener 53.

When the apparatus is in operation, a portion of the filtered liquid discharged from the outlet of the pump 16 is delivered through the pipes 38, 37 and 9 and through the shaft 20 to the tubes 39 of the backflushing nozzles. As the nozzles, rotating with the shaft 20, sweep over the upper surface of the filter screen 5, liquid is discharged from the tubes 39 through the orifices 41 and passes downwards through the filter screen to flush off the contaminant adhering to the lower side of the screen.

Since the backflushing nozzles move continuously over the filter screen there might be a tendency for the contaminant which is flushed off the screen to be sucked back onto the screen behind the moving nozzles. To prevent this happening there is provided directly beneath each backflushing nozzle, adjacent the lower side of the screen, a shroud 54 in the form of a sleeve of rectangular cross-section arranged with its axis perpendicular to the screen. The cross-section of each shroud has longitudinal and transverse dimensions similar to those of the associated nozzle. The shrouds are carried by a member 55 which is secured by a screw 56 to the plug 36 at the lower end of the shaft 20 so that the shrouds rotate with the backflushing nozzles. The shrouds shield the contaminant which is flushed off the filter screen from the suction prevailing at the adjacent areas of the lower side of the screen so that the contaminant is free to fall away from the screen.

The pressure-differential which exists between the upper and lower sides of the filter screen may cause the screen to bow upwards slightly between its inner and outer peripheries. The flexibility of the tubes 39 of the backflushing nozzles will accommodate such bowing and ensure that the tubes remain in contact with the upper surface of the filter screen throughout their lengths.

As shown in FIG. 3, the spacing between the orifices 41 in each tube 39 is less in the outer portion of the tube, i.e., the portion further from the shaft 20, than in the inner portion. The purpose of this is to obtain a higher rate of discharge of liquid from the outer portion of the tube than from the inner portion in order to compensate for the difference in linear speed of the two portions of the tube.

Although two backflushing nozzles are provided in the apparatus shown in the drawings, only one is essential. The two diametrically opposed nozzles are provided in order to balance the load exerted on the shaft 20 and bearings 21 and 22 by the back pressure acting on the nozzles. A similar balancing can be obtained with more than two nozzles.

The backflushing pressure is controlled by a spring-loaded valve member 57 (shown diagrammatically in FIG. 5) which is arranged in one branch 58 of a T-junction 59, the other branch 60 of which is connected to the pipe 38 and the main limb 61 of which is connected to the outlet of the pump 16. The valve member 57, which may be of any convenient known form, has an adjustable spring-loading so that it can be set to open at a given pressure. Some of the filtered liquid discharged from the outlet of the pump 16 will be delivered at this pressure to the backflushing nozzles 18 and 19 through the branch 60 of the T-junction 59 and the remainder will flow through the branch 58 of the T-junction past the valve member 57 to the storage tank or the point of use, as the case may be.

The level of liquid in the tank 1 is determined by the rate at which the contaminated liquid is fed into the tank 1, the rate at which the pump 16 withdraws liquid from the tank via the suction chamber and the rate at which liquid re-enters the tank via the backflushing nozzles. These rates are all so governed that the level of the liquid in the tank 1, as shown by way of example at L in FIG. 2, is always above the filter screen 5. Usually the pump 16 will be arranged to deliver the filtered liquid directly to the point of use and the contaminated liquid will simply drain into the tank 1. It is then necessary merely to arrange for the pump 16 to withdraw liquid from the tank via the suction chamber at a rate equal to the combined rates at which the contaminated liquid drains into the tank and liquid re-enters the tank via the backflushing nozzles. If more than one pump is used in the apparatus the pumps must be so controlled that the level of the liquid in the tank 1 does not fall below the filter screen 5.

The contaminant which is flushed off the filter screen 5 falls to the bottom of the tank 1, whence it is removed by a continuously operating mechanism which includes a series of scraper bars 62 (FIGS. 1 and 2). The bars 62 are carried by a pair of continuously moving endless roller chains 63 and 64 which pass round two pairs of sprockets 65 and 66 and round guides 67 and 68. The chains are driven by an electric motor (not shown). In the lower part of their path the scraper bars 62, drawn by the chains 63 and 64, travel along the bottom of the tank 1 and up the ramp 2 to emerge from the liquid in the tank. As the scraper bars travel along this part of their path they push before them the contaminant which has been flushed off the filter screen 5 and fallen to the bottom of the tank 1. The contaminant is eventually pushed off the upper end of the ramp and falls into a collecting bin 69.

It is not essential for the scraper bars 62 to operate continuously; they may be arranged to operate periodically or may be brought into operation as and when sufficient contaminant has accumulated on the bottom of the tank 1 to require removal. Likewise, the backflushing mechanism does not have to be in continuous operation. It, too, may be arranged to operate periodically or may be brought into operation as and when the need for backflushing arises.

To gain ready access to the filter screen 5 or, by removal of the screen, to the interior of the dome 4, for example, for maintenance purposes, the dome can be turned upside down by rotating the pipe 9 through 180° about its longitudinal axis after loosening the coupling 11 and uncoupling the pipe 10 from the pipe 71. Also, the chain 31 has to be disconnected from the transmission mechanism 72.

What we claim is:

1. Apparatus for separating contaminants from liquid with a filter on which the contaminants adhere, the apparatus when upright comprising: a container for said liquid to be filtered, a suction chamber having a liquid-pervious wall with the filter thereon for communicating with liquid in the container, means for creating suction in the suction chamber for drawing liquid from the container through the filter into the suction chamber, a backflushing nozzle located in the suction chamber above the filter and movable between different positions in contact therewith, means for moving the nozzle between said positions, means for delivering clean liquid under pressure to the backflushing nozzle to be discharged therefrom downward through the filter for flushing off of the filter, contaminants separated from the contaminated liquid and adhering to the filter, means for removing from the container the contaminant which is flushed downward off the filter, shroud means disposed below the filter directly opposite the nozzle and operable to always move with the nozzle, the shroud means defining a housing through which flows the contaminant flushed downward, whereby said flushed contaminant is shielded from being entrained in the upward flow of liquid adjacent to the nozzle.

2. An apparatus as claimed in claim 1, wherein the filtering element comprises a circular filter screen and the backflushing nozzle extends radially of this screen and is rotatable about the central axis thereof.

3. An apparatus as claimed in claim 2, comprising a plurality of backflushing nozzles equispaced about the central axis of the filter screen and connected at their inner ends for rotation together about this axis.

4. An apparatus as claimed in claim 2, wherein the suction chamber is formed by a dome which is supported in the container with its mouth directed downwards, and wherein the filter screen is fixed across the mouth of the dome.

5. An apparatus as claimed in claim 2 wherein the means for creating suction is a pump having its inlet connected to the interior of the dome.

6. An apparatus as claimed in claim 5, wherein the backflushing nozzle is fixed at its inner end to a hollow shaft which extends along the central axis of the dome and is rotatable in the dome, the nozzle communicating with the interior of the shaft through an aperture in the wall of the shaft and the interior of the shaft through an aperture in the wall of the shaft and the interior of the shaft being connected with the outlet of the pump.

7. An apparatus as claimed in claim 6, wherein the outlet of the pump communicates through a first duct with the interior of the hollow shaft and through a second duct with a storage vessel or point of use for the filtered liquid, the second duct containing a valve member which is urged by spring means to close the duct and which is arranged to be opened against the pressure of the spring means by filtered liquid discharged by the pump so that the spring means govern the pressure of the liquid supplied to the backflushing nozzle or nozzles.

8. An apparatus as claimed in claim 7, comprising an electric motor and means for transmitting drive from the motor to the hollow shaft to rotate the shaft.

9. An apparatus as claimed in claim 8, wherein the transmission means comprise a chain passing round a sprocket which is fixed on a portion of the hollow shaft projecting externally of the dome.

10. An apparatus as claimed in claim 2 wherein the backflushing nozzle comprises a tube extending radially of the filter screen and having a flexible wall which is in contact with the screen and in which is formed a row of orifices extending longitudinally of the tube.

11. An apparatus as claimed in claim 10, wherein spring means are arranged to press the flexible wall of the tube into contact with the filter screen.

12. An apparatus as claimed in claim 10, wherein the spacing between the orifices in the flexible wall of the tube decreases towards the end of the tube which is nearer the periphery of the filter screen so that the rate of discharge of liquid from the tube increases towards this end of the tube in order to compensate for the increase in the linear speed of the tube towards said end thereof.

13. An apparatus as claimed in claim 4, wherein the dome is supported so as to be rotatable about a horizontal axis to bring the dome into a position in which the mouth of the dome is directed upwards.

* * * * *